United States Patent
Kock et al.

(10) Patent No.: US 8,225,692 B2
(45) Date of Patent: Jul. 24, 2012

(54) POSITIONING DEVICE

(75) Inventors: Soenke Kock, Vaesteras (SE); Sven Soetebier, Ladenburg (DE); Wolfgang Waldi, Nussloch-Maisbach (DE)

(73) Assignee: ABB AG, Mannheim (DE)

( * ) Notice: Subject to any disclaimer, the term of this patent is extended or adjusted under 35 U.S.C. 154(b) by 686 days.

(21) Appl. No.: 12/282,827

(22) PCT Filed: Mar. 6, 2007

(86) PCT No.: PCT/EP2007/001890
§ 371 (c)(1),
(2), (4) Date: Sep. 12, 2008

(87) PCT Pub. No.: WO2007/104446
PCT Pub. Date: Sep. 20, 2007

(65) Prior Publication Data
US 2009/0065664 A1 Mar. 12, 2009

(30) Foreign Application Priority Data
Mar. 13, 2006 (DE) .......................... 10 2006 011 823

(51) Int. Cl.
*B25J 18/02* (2006.01)
(52) U.S. Cl. .................... 74/490.03; 74/490.05; 901/19; 901/23
(58) Field of Classification Search ............... 74/490.01, 74/490.03–490.08, 89.27, 89.28; 414/735; 901/15, 29, 23, 27, 28
See application file for complete search history.

(56) References Cited

U.S. PATENT DOCUMENTS

| 703,251 | A | * | 6/1902 | Haire | 254/30 |
| 1,789,975 | A | * | 1/1931 | Heil et al. | 298/21 R |
| 2,765,024 | A | * | 10/1956 | Brundage | 108/20 |
| 2,803,146 | A | * | 8/1957 | Brundage | 74/89.28 |
| 5,656,905 | A | | 8/1997 | Tsai | |
| 5,715,729 | A | * | 2/1998 | Toyama et al. | 74/490.03 |
| 5,787,758 | A | | 8/1998 | Sheldon | |
| 5,865,063 | A | * | 2/1999 | Sheldon | 74/490.01 |
| 5,987,726 | A | | 11/1999 | Akeel | |
| 6,003,393 | A | * | 12/1999 | Kimura et al. | 74/89.28 |
| 6,041,500 | A | | 3/2000 | Terpstra | |
| 6,240,799 | B1 | | 6/2001 | Yau | |
| 6,425,177 | B1 | | 7/2002 | Akeel | |
| 6,575,676 | B2 | * | 6/2003 | Wang et al. | 409/201 |
| 7,673,384 | B2 | * | 3/2010 | O'Connell et al. | 29/787 |
| 2004/0146388 | A1 | * | 7/2004 | Khajepour et al. | 414/680 |
| 2008/0078266 | A1 | * | 4/2008 | Soetebier et al. | 74/490.13 |

FOREIGN PATENT DOCUMENTS

| CN | 1190915 A | 8/1998 |
| CN | 100354069 C | 12/2007 |
| DE | 69308708 | 6/1997 |

(Continued)

*Primary Examiner* — David M Fenstermacher
*Assistant Examiner* — Terence Boes
(74) *Attorney, Agent, or Firm* — Leydig, Voit & Mayer, Ltd.

(57) ABSTRACT

A positioning device includes a supporting structure, a work carrier, at least six length-adjustable struts arranged in strut pairs, each strut being moveably mounted to the supporting structure and to the work carrier and at least one drive configured to adjust a length of at least one of the struts. The struts of each strut pair are disposed parallel to each other and each strut pair has a pivot bearing disposed at a first end of each strut and a second bearing disposed at a second end of each strut.

13 Claims, 19 Drawing Sheets

FOREIGN PATENT DOCUMENTS

| | | |
|---|---|---|
| DE | 19709851 | 10/1997 |
| EP | 0997238 | 5/2000 |
| WO | WO-0185402 | 11/2001 |
| ZA | 9605055 A | 1/1997 |

* cited by examiner

POSITIONING DEVICE

CROSS REFERENCE TO RELATED APPLICATIONS

This application is a U.S. National Phase application under 35 U.S.C. §371 of International Application No. PCT/EP2007/001890, filed on Mar. 6, 2007, which claims priority to German Patent Application No. DE 10 2006 011 823.5, filed on Mar. 13, 2006. The International Application was published in German on Sep. 20, 2007 as WO 2007/104446 under PCT Article 21(2).

FIELD

The present invention relates to a positioning device having a supporting structure, having a work carrier and having length-adjustable struts which are respectively connected, on one hand, to the supporting structure and, on the other hand, to the work carrier, wherein the struts are movably mounted at the points of connection to the supporting structure and the work carrier, wherein at least some of the struts are adjustable in length and wherein at least some of the struts have a drive for adjusting their length.

BACKGROUND

From the prior art, different positioning devices of the generic type have become known, which are used in a variety of technical fields. The known positioning devices serve to hold an object in position. Such positioning devices are therefore used, for instance, to position a workpiece relative to a tool such that the workpiece can be worked with the aid of the tool. In the automobile industry, a body part of a vehicle, for instance, is positioned in a work station or similar with the aid of usually a plurality of positioning devices. The thus positioned vehicle body can then be machined by, for example, welding robots.

Thus, U.S. Pat. No. 5,787,758 describes a three-axis positioning device which serves for the positioning of objects such as, for instance, workpieces, tools, sensors, optical surfaces, and so on. The known positioning device has a supporting structure, which is connected by positioning elements to an adjustable machine component. The machine component receives the object and, by the actuation of the positioning elements, can be moved and positioned relative to the supporting structure. However, the machine component is intended to be movable only in the direction of the axes of a Cartesian coordinate system of the machine component, the origin of which is fixedly connected to the machine component. A tilting, pivoting or rotation of the machine component about these axes is intended to be barred. For this purpose, the known positioning device has three struts, which are attached, on the one hand, to the supporting structure and, on the other hand, to the machine component. The struts are here connected to and configured with said parts in such a way that they prevent the machine component from being pivoted about these axes. The struts have two strut portions, which are hinge-connected to each other, so that the length of the strut can be adjusted or altered by this being folded open or shut.

SUMMARY OF THE INVENTION

Such positioning devices have the drawback, in particular, that they occupy a lot of space and room. This can lead to problems, particularly if the positioning device is disposed in a production line or similar, since here there is generally little space available between the robots, conveyor belts, structural parts, and so on. Furthermore, the known positioning devices do not have the necessary rigidity to be able to counter the sometimes very high loads. In addition, the assembly of the known positioning devices turns out to be very complex.

An object of the invention is to define a positioning device which is of compact and space-saving construction and has a high rigidity.

This object is achieved by a positioning device having a supporting structure, having a work carrier and having length-adjustable struts. Accordingly, an inventive positioning device of the type stated in the introduction is characterized in that at least six of the struts are arranged in pairs, in that, in a strut pair, the struts are arranged in parallel, in that each strut pair, at a first end of the longitudinal extent of the struts, has a pivot bearing, and in that each strut pair, at a second end of the longitudinal extent of each strut, has a second bearing.

Although forces are absorbed by each strut individually, each pair of struts, viewed as a force couple, can also absorb a torque. The average load of the struts is hereby reduced. Moreover, the parallel arrangement of the struts into strut pairs, complete with special designs of the pivot bearing at one end of the longitudinal extent of the struts, exhibits an advantageous rigidity of the total structure. A further advantage of such an arrangement of struts can be seen in the fact that the positioning device is designed relatively compact in relation to the forces and torques which it can bear.

In an advantageous embodiment of the subject of the application, the struts are precisely six in number.

The positioning device thus has precisely three length-adjustable strut pairs, which, given appropriate spatial arrangement on the supporting structure, convey the forces and torques of a workpiece into the supporting structure in a particularly advantageous manner.

According to the invention, it is also provided that each strut pair has a common drive.

In this way, the positioning device becomes yet more compact in total and the control complexity for controlling the drives is correspondingly less.

It is additionally advantageous if the drive is connected to the respective strut pair by an angle-preserving connection, in particular a belt, a toothed belt, a gear system or gearwheels.

Further advantageous embodiments of the positioning device according to the invention can be derived from the claims.

BRIEF DESCRIPTION OF THE DRAWINGS

On the basis of the illustrative embodiments represented in the drawings, the invention, advantageous embodiments and improvements of the invention, as well as the particular advantages thereof, shall be explained and described in greater detail below, wherein.

DETAILED DESCRIPTION

Figure 1:
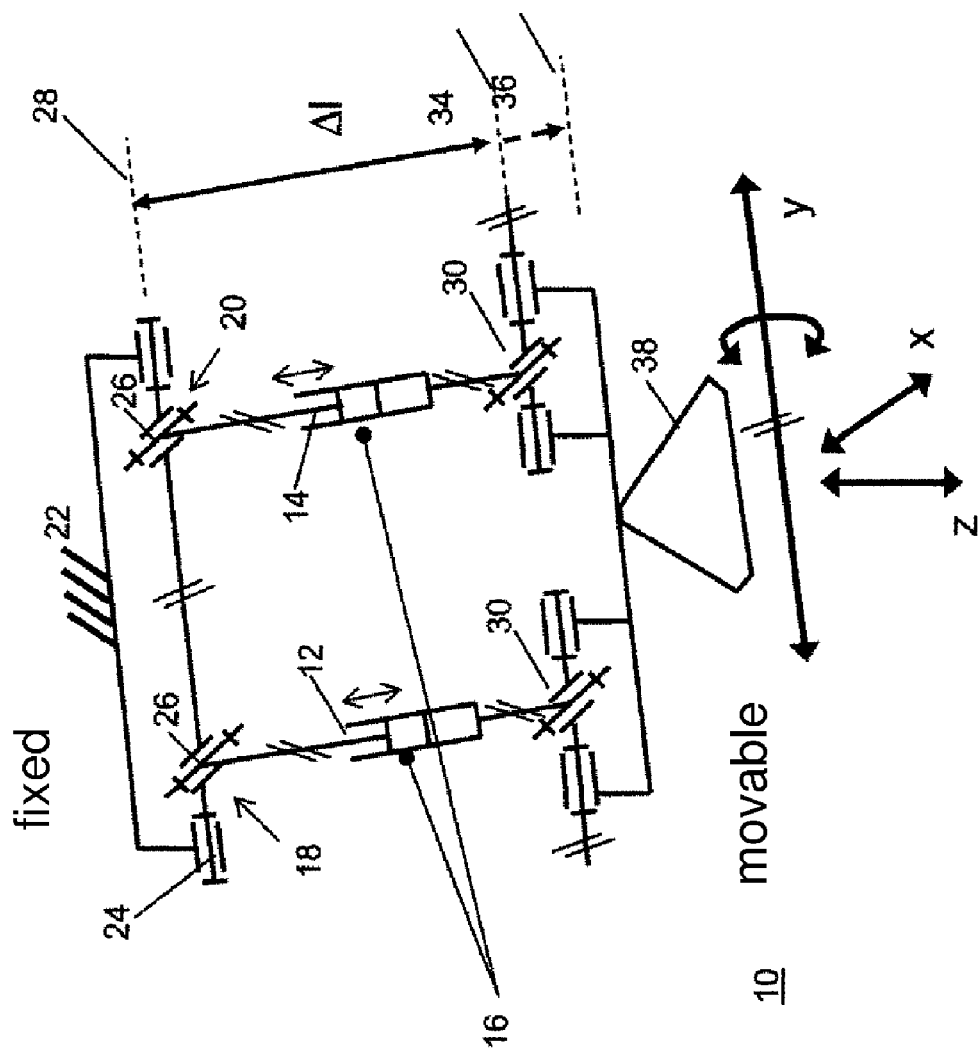
FIG. 1 shows a first basic plan of a length-variable pair of supports.

FIG. 1 shows a basic plan 10 of an inventive pair of supports of a positioning device, in which a first strut 12 and a second strut 14 are arranged in parallel and at a distance apart which is predetermined by the construction. Both struts 12, 14 are adjustable in their length, as is represented in the first plan 10 by a piston-cylinder arrangement 16. In this context, different types of drive are here conceivable, such as, for example, hydraulic, pneumatic or electric, but also a mechanical length adjustment, which is then in turn moved by a pneumatic, hydraulic or electric drive. Similarly, a manual adjustment is additionally conceivable, to be used, for example, with the aid of a crank, in the event of a drive failure.

The struts 12, 14, at a first end of their longitudinal extent, represented at the top in FIG. 1, are fixedly connected by a first 18 and a second Cardan joint 20 to a supporting structure 22. In this case, each Cardan joint 18, 20 respectively has a first 24 and a second pivot bearing 26. The respectively first pivot bearings 24 are here fixedly connected to the supporting structure 22 and have a construction-dictated fixed distance apart. Moreover, the first pivot bearings 24 are arranged such that they have a common first pivot axis 28. At the second end of their longitudinal extent, the struts 12, 14 respectively have a third pivot bearing 30, these third pivot bearings 30 being mounted jointly on a fourth pivot bearing 32. It is thereby ensured according to the invention that the third pivot bearings 30, too, have a distance apart predetermined by the construction and jointly pivot on a second pivot axis 34. The second pivot axis 34 is distanced by a predetermined amount from the pivot axis 28, whereby the necessary length of the strut pairs is defined. The common pivot bearing 32 with pivot axis 34 is in turn fixedly connected to a moving platform 38 which is usable as a work carrier. Connected in this way, the platform 38 acquires, in relation to a fixed supporting structure 22, the mobility symbolized by the arrows in FIG. 1. The distance apart of the pivot axes 28 and 34 here alters according to the position and orientation of the platform, for example the axis 34 can lengthen to the position of the axis 36.

With the bearing plan, described in greater detail above, for the lower mounting of the struts 12, 14, those degrees of freedom for the mounting as a whole are obtained which are shown in the figure by the arrow directions referenced as X, Y and Z.

Figure 2:
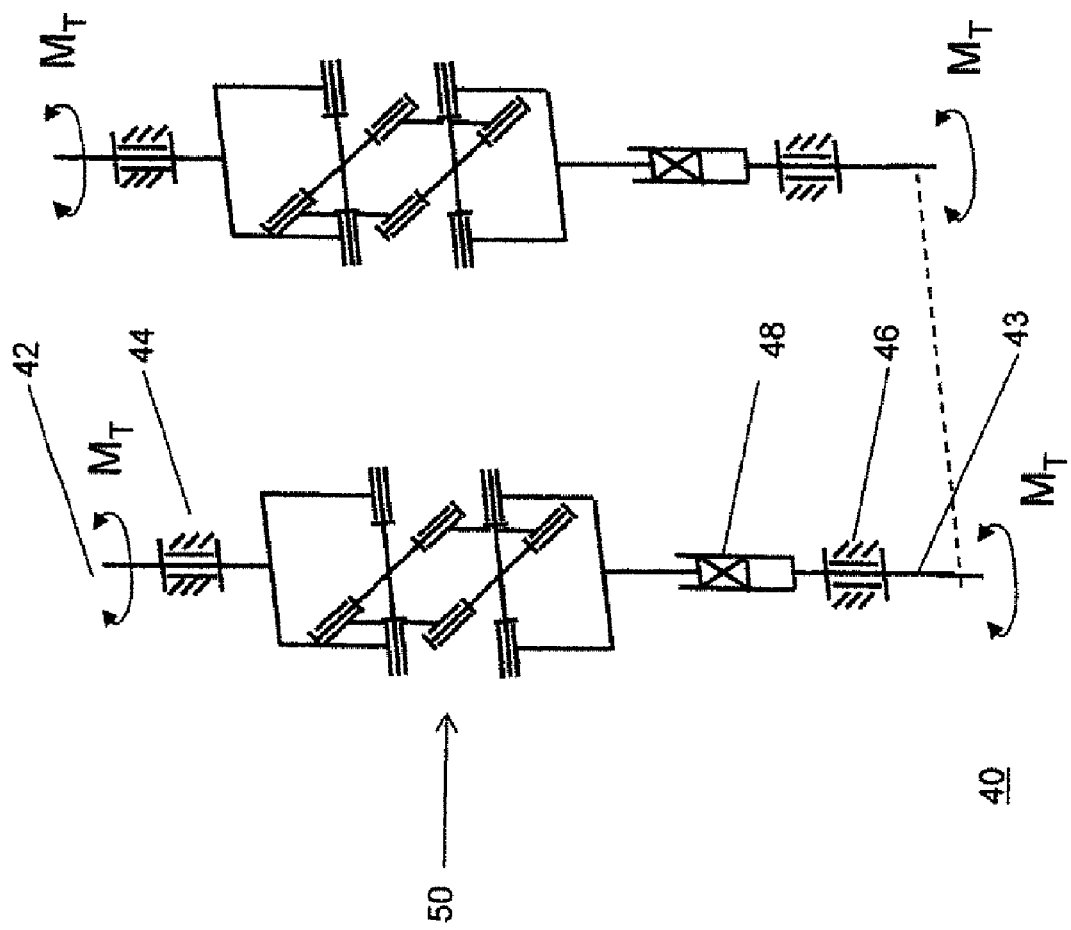
FIG. 2 shows a first plan for the coupling of a pair of supports.

For a common and length-synchronous mechanical driving of the strut pairs, three embodiments are possible according to the invention. FIG. 2 shows a first plan 40 for the kinetic coupling of the strut pair, which coupling, with the aid of an articulated joint arrangement, transmits the drive power of a motor to a strut pair in a specific manner. In a positioning device according to the invention, this articulated joint arrangement enables the drive power of the engine to be transmitted irrespective of the position and orientation of the pivoted strut pair, without this resulting in a deformation or jamming. Respectively one of the two shafts 42 and 43 can be used as the drive-side or output-side shaft. If the shaft 42 is used as the output-side shaft, for instance, then this shall be disposed parallel to the respective strut axis 12 or 14 from FIG. 1. The drive-side shaft 43 is decoupled by the described articulated joint arrangement from the position and orientation of a strut and can be assigned with its swivel bearing 46 either to a supporting structure 22 or to the shaft body of the pivot bearing 24. According to the invention, two articulated joint arrangements 40 are required to drive a strut pair. It thereby becomes possible to distribute the drive power necessary for the strut adjustment from a drive mechanism to both struts. In this case, it is immaterial on which end of the struts the respective bearings are disposed. In FIG. 1, the articulated joint combinations 30, 32 and the individual articulated joints of the Cardan joints 18, 20 could be mutually exchanged or replaced. Thus, both articulated joints 30, 32 could also be disposed at the upper end of the struts 12, 14, while the Cardan joints 18, 20 could be disposed at the lower end. Accordingly, the articulated joint arrangement 40 can be assigned either to the platform-side articulated joints or to the articulated joints of the supporting structure in order to transmit the drive power to the strut pair. Between a first 44 and a second swivel bearing 46, on the first rotational axis 42 there is disposed a torsionally rigid length-compensating element 48, as well as a third Cardan joint 50. In this way, the functioning of a common and length-synchronous mechanical drive of the strut pairs is realized by particularly favorable technical means, using standard elements of the art. It is also conceivable for the bearing forces of the two swivel bearings 44 or 46 to be absorbed in a common housing.

Figure 3:
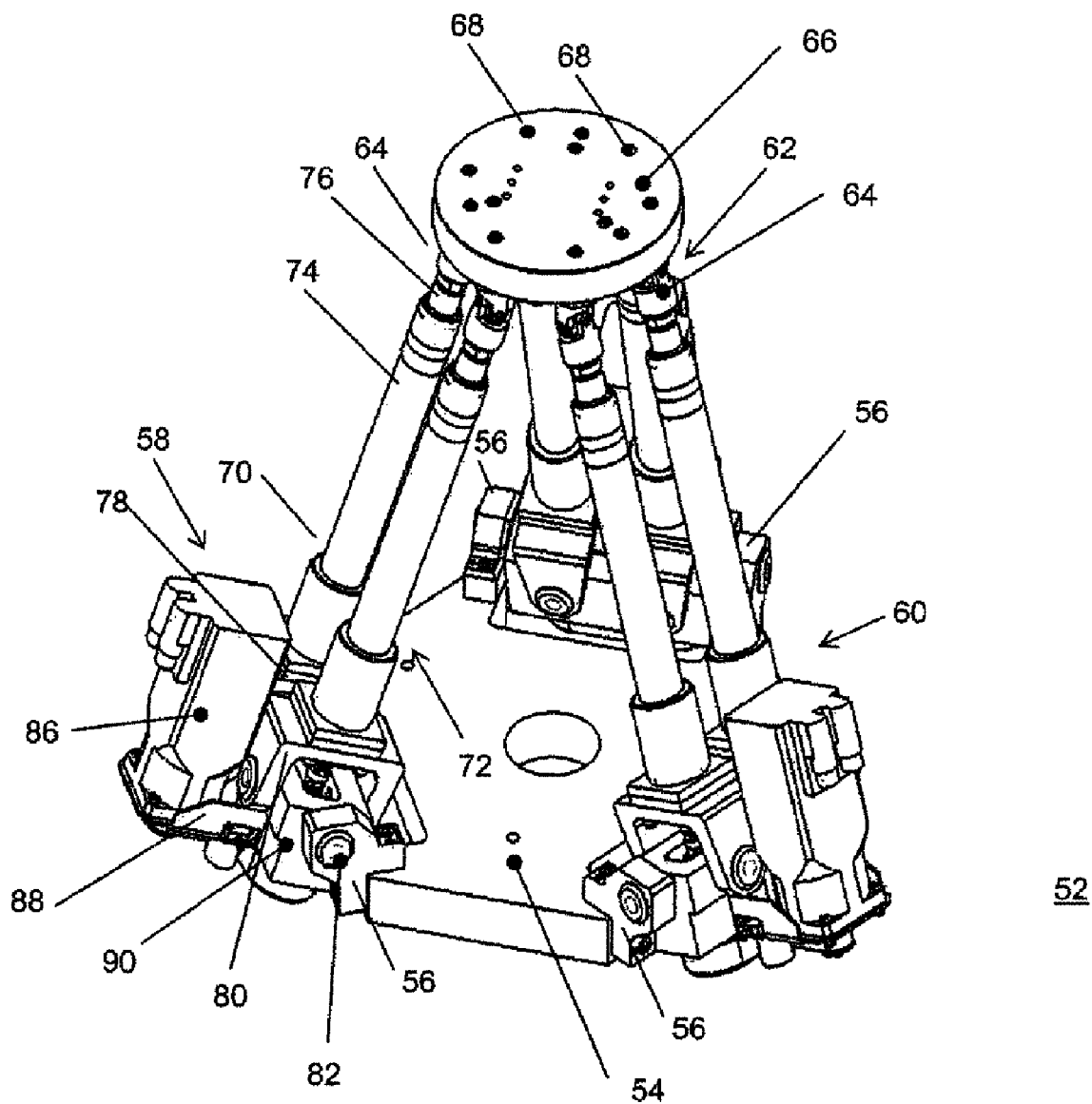
FIG. 3 shows a three-dimensional view of a first embodiment of a positioning device.

FIG. 3 shows a first positioning device 52 as a three-dimensional view. A base plate 54 is connected by first connecting elements 56 to a first 58, a second 60 and a third strut pair 62. The base plate 54 is of roughly honeycombed configuration, a first end of the strut pairs 58, 60, 62, namely the lower end, being disposed on each second side of the base plate 54. In this way, a linearly symmetrical starting position for the strut pairs 58, 60, 62 is reached, which has a particularly favorable effect upon the forces to be absorbed by the positioning device 52 and their onward transmission.

Each strut of one of the strut pairs 58, 60, 62 is connected at its upper end, by means respectively of a universal joint 64, to a tool plate 66. The universal joints 64 are Cardan joints and the tool plate 66 is configured in the present example as a disk. When spacing out the universal joints 64 of each strut of a strut pair 58, 60, 62, care should be taken to ensure that the struts can lie parallel to one another. Moreover, the diameter of the tool plate 66 is chosen smaller than the outer diameter of the base plate 54, so that the strut pairs respectively have a specific angle to an imaginary perpendicular on the base plate 54, in any event in a starting position in which the strut pairs have an equal length. This starting position can, however, change accordingly in accordance with the length adjustment facility of the individual struts.

The tool plate 66 has a number of cutouts 68, for example boreholes, through-holes or threaded holes, which allow various tools to be fitted onto this tool plate 66. In simple cases, such a tool is a pin, a locating gripper or some other connecting element to the workpiece.

Based on the first strut pair 58, various structural parts belonging to each of the strut pairs 58, 60, 62 are about to be described in greater detail. The first strut pair 58 here has a first 70 and a second strut 72, which substantially consist of a first 74 and a second cylindrical structural element 76. The second cylindrical structural element 76 is here guided in the first one 74 such that a telescopic lengthening of the structural elements 74, 76 is enabled, the cylindrical structural elements 74, 76 preferably having, reciprocally, a rotational degree of freedom along the common symmetrical axis, for which reason, according to the invention, only tensile and compression forces, but no torques, can be applied to the struts and a deformation of the positioning device is prevented. Usually, the lengthening of the structural elements is effected via a built-in spindle or threaded drive.

A universal joint 64 on each of the struts 70, 72 serves respectively to ensure that the predetermined distance between the struts at the point of connection to the tool plate 66 is non-variable. The universal joint 64 has a cardanic mounting, that is to say the struts 70, 72 are provided in principle with a mounting having two degrees of freedom. At the lower end of the first strut 70 there is disposed a fifth pivot bearing 78 and, correspondingly, at the lower end of the second strut 72, a sixth pivot bearing 80. The distance between the fifth 78 and the sixth pivot bearing 80, related to the bearing shaft centers, corresponds to the distance apart of the upper universal joints 64. The effect of this is that the struts 68, 70 are definitely arranged parallel to each other, as long as they have an equal length. This is a problem relating to a synchronous lengthening or shortening of the struts 68, 70, which shall be described in greater detail later.

The fifth 78 and the sixth pivot bearing 80 are supported by their bearing shafts such that they can be pivoted only perpendicular to a further bearing shaft 82 of a seventh pivot bearing 84. The seventh pivot axis 84 is here situated tangentially to an imaginary circle around a virtual perpendicular to the base plate 54, to be precise, in its center point.

For a common and length-synchronous driving of its length adjustment mechanism, the first strut pair 58 has a common electric drive 86, which in the lower region of the struts 70, 72 is connected by a connecting element 88 to a supporting structure 90. The supporting structure 90 is connected on the bearing shaft 82 in such a way that, when the shaft is rotated, it is jointly pivoted, such that both the connecting element 88 and the electric motor 86 are jointly pivoted in the event of a pivot motion. It is thereby ensured that the relative position of the electric motor 68 to the strut feet of the first strut pair 58 does not change. The details of a possible force transmission or torque transmission from the electric motor 68 to the first strut pair 58 are explained in greater detail later, since, in principle, several options are in this case obtained.

Figure 4:
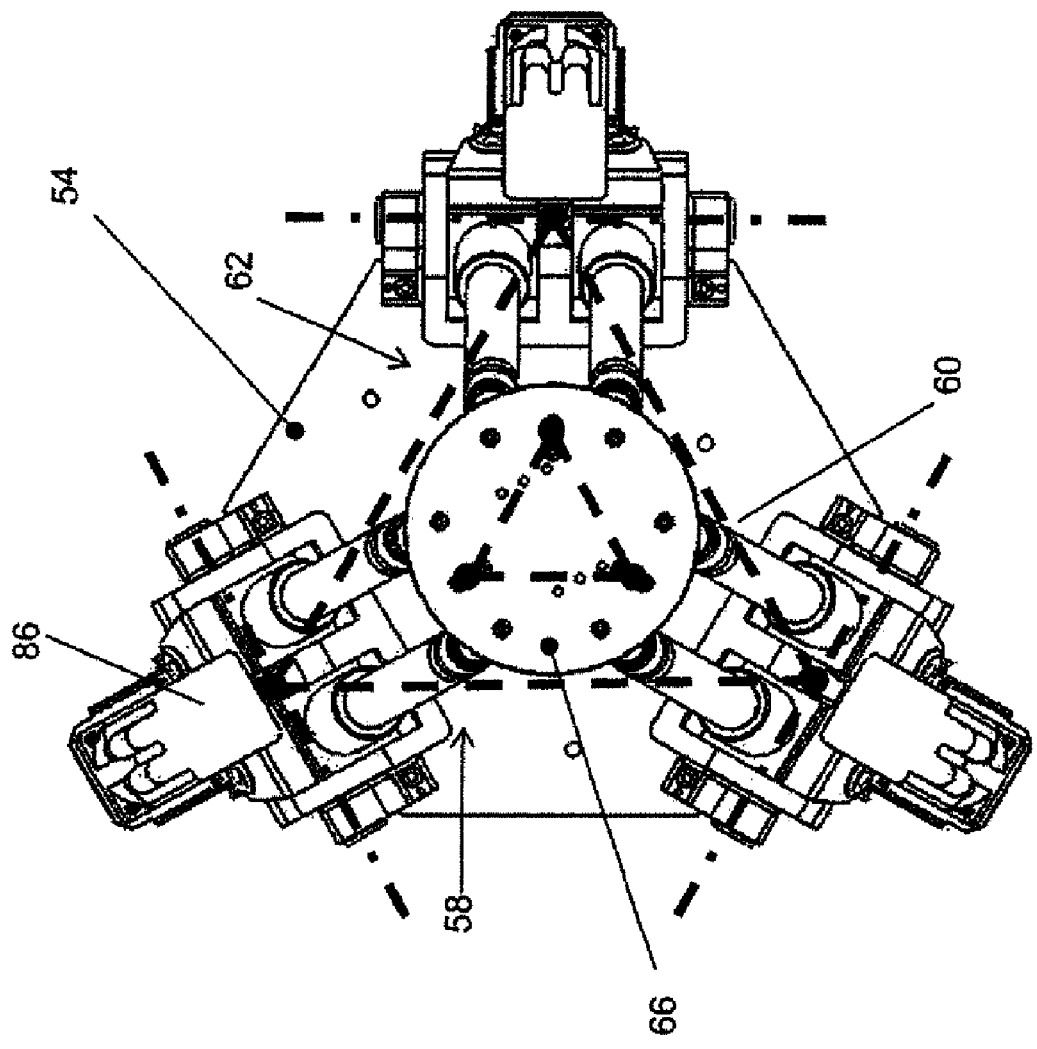
FIG. 4 shows a top view of the embodiment of the positioning device.

FIG. 4 shows the first positioning device 52 in a top view of the tool plate 66 from above, wherein the strut pairs 58, 60, 62 have an equal length, so that the tool plate 66 in this view is disposed precisely centrally above the base plate 54. In this figure, the reference symbols for the same parts as can also be seen in FIG. 3 are used correspondingly. From this figure, through the illustration of the pivot bearing shafts, namely the bearing shaft 82 and the corresponding pivot bearing shafts of the further strut pairs 60, 62, it can be gleaned that a symmetrical arrangement of the strut pairs 58, 60, 62 in an equilateral triangle has been chosen, which arrangement, at least in this starting position of the tool plate 66, produces a favorable, even and symmetrical distribution of the forces and torques which might act upon the tool plate 66 among the individual strut pairs 58, 60, 62. In this way, a favorable identical layout of each of the individual structural parts is possible and the possibility is afforded, through the homogeneous design of the strut pairs 58, 60, 62 and also of their mountings and drive mechanism, of respectively designing and producing only drive and strut pair type, which then gives rise to the corresponding positioning device.

Figure 5:
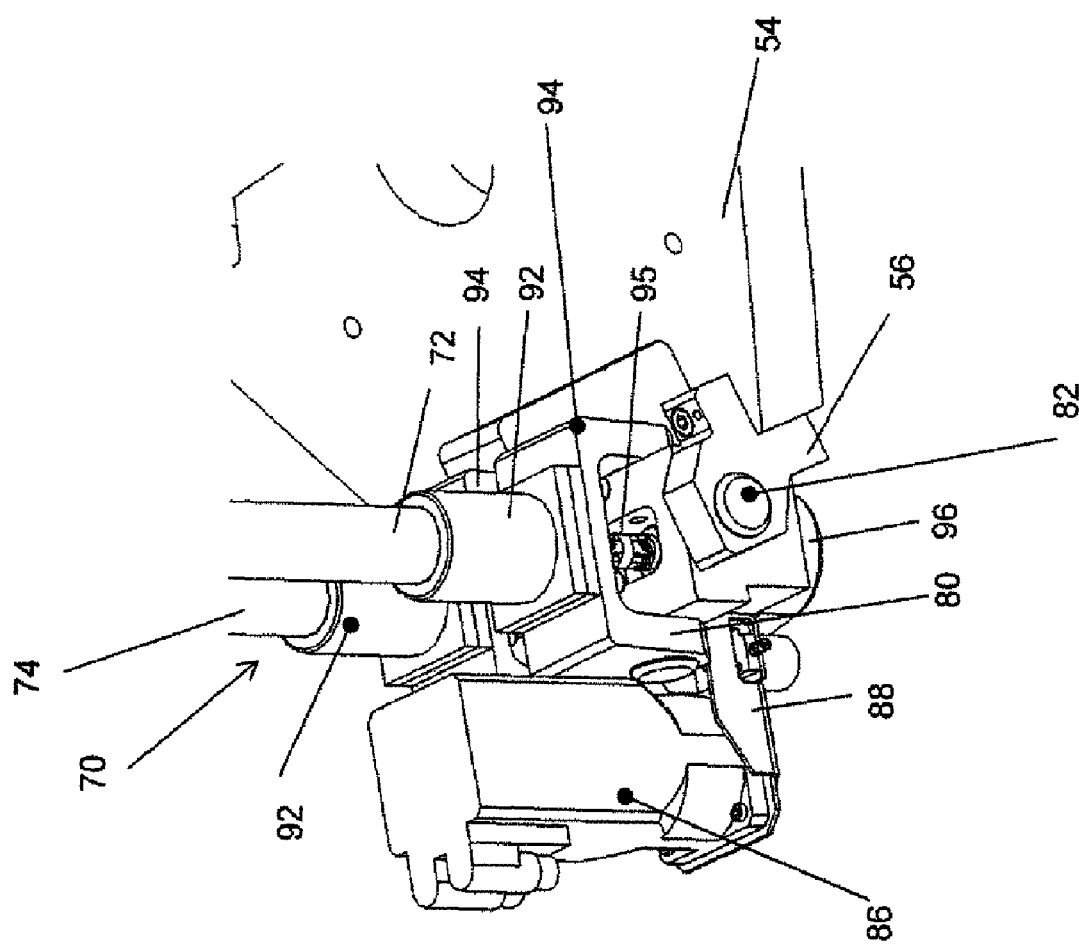
FIG. 5 shows a detailed representation of a strut pair foot of the positioning device.

FIG. 5 shows a detailed enlargement of the foot of the first strut pair 58, wherein the electric motor 86, the connecting element 88, the sixth pivot bearing 80, the bearing shaft 82 and the first connecting element 56 are represented on an enlarged scale. In the figure, lower connecting elements 92 are clearly shown, which connect the first cylindrical structural part 74 of the first strut 70 fixedly to a first pivot fork 94 of the fifth pivot bearing 78. The sixth pivot bearing 80 of the second strut 72 is also connected to a corresponding pivot fork 94.

In this figure, it is further represented on an enlarged scale that a mechanical connection exists between a lower subassembly 96 and the second cylindrical structural part 76 or the corresponding structural part of the second strut 72.

Figure 6:
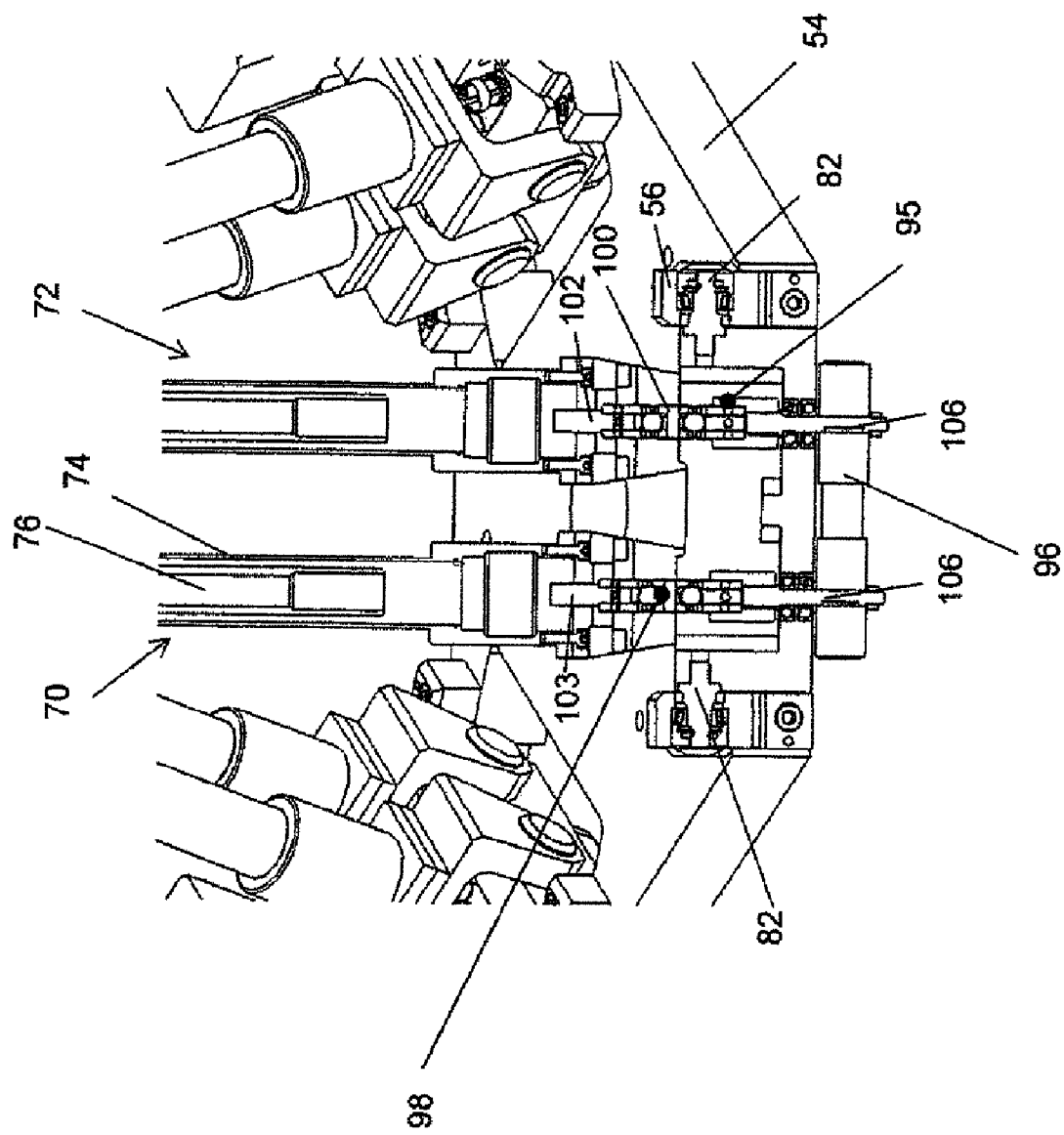
FIG. 6 shows a second detailed representation of the strut pair foot, partially realized as a section diagram.

FIG. 6 shows in a cross section through the bearing shaft 82 a first embodiment of the mechanical connection 95 in the form of a fourth 98 and a fifth Cardan joint 100 in accordance with the first plan in FIG. 2. The Cardan joints 98, 100 are, on one hand, connected to rods 102, which effect a rotary motion of the second cylindrical structural part 76 beneath the corresponding structural part of the second strut 62. On the other hand, the Cardan joints 98, 100 are connected to coupling elements, which in turn are connected to drive shafts 106. In the lower subassembly 96 (not represented in detail), it is ensured that the drive 86 drives both drive shafts 106 at a same speed, thereby ensuring that the strut pairs uniformly lengthen or shorten in their longitudinal extent. In the represented embodiment of the first strut pair 58, this is intended to be realized by the common drive through a common gearwheel, which in this figure, however, does not fall into the plane of the picture and thus is not represented. In this type of drive, care should be taken to ensure that one of the second structural elements 76 is extended by a left rotation, while the other is driven by a right rotation and is thus lengthened by a right rotation (or vice versa). In a shortening, the drive works with a correspondingly interchanged rotational direction.

Figure 7:
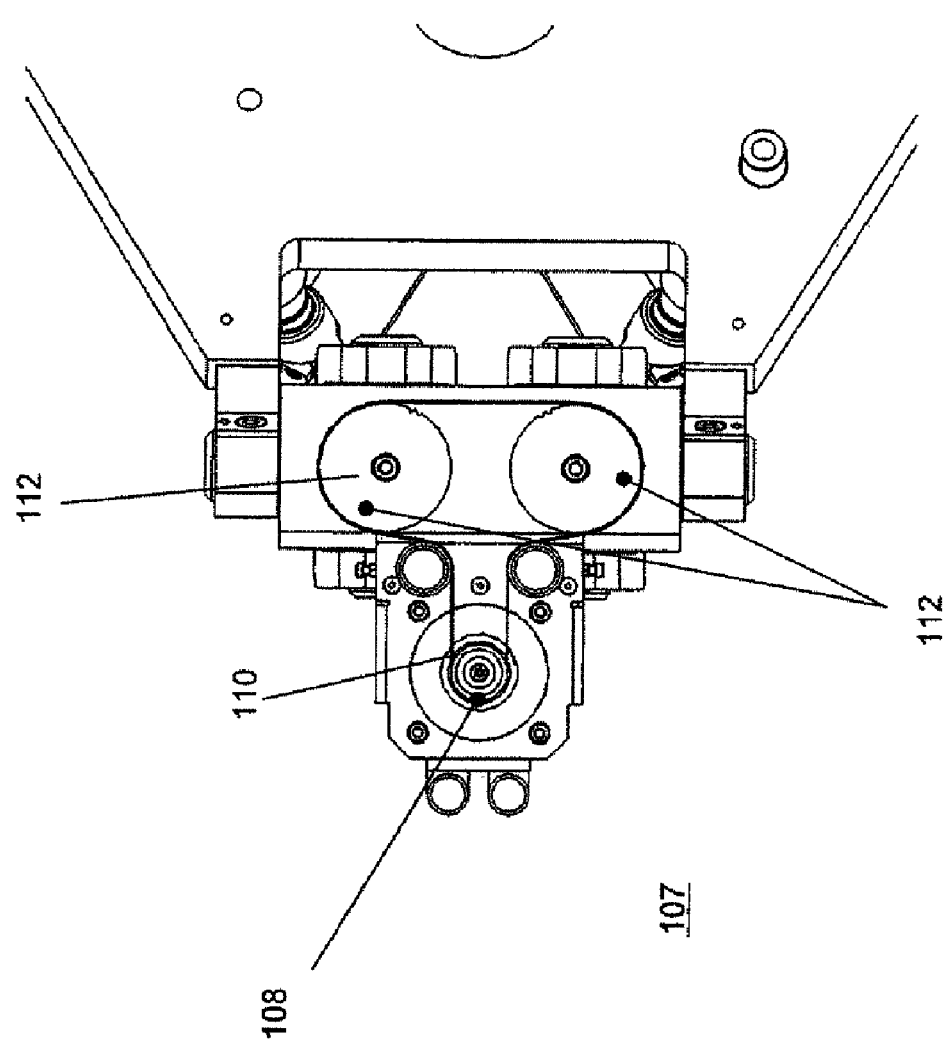
FIG. 7 shows a basic sketch of a toothed belt drive for a pair of supports.

FIG. 7 shows a second design option for a drive of a mechanism for adjusting the length of strut pairs, the essential difference between the illustrative embodiment of the preceding figure and this being apparent in the fact that a second electric motor 108 drives a toothed belt 110, which is additionally operated via the drive pulleys 112, which substantially fulfill the function of the drive shafts 106 from the previously presented embodiment. The tension in the toothed belt is achieved via two adjustable tension pulleys, which apply to a toothless rear side of the toothed belt 100 a force predefinable by the adjustment and in this way maintain the toothed belt 110 at an initial tension predetermined by the layout. In the second embodiment 107, a drive for the second cylindrical structural parts 76 is additionally achieved which is equidirectional, so that, in the design of the struts, regard advantageously does not have to be paid to the rotational direction in the driving of the structural parts.

Figure 8:
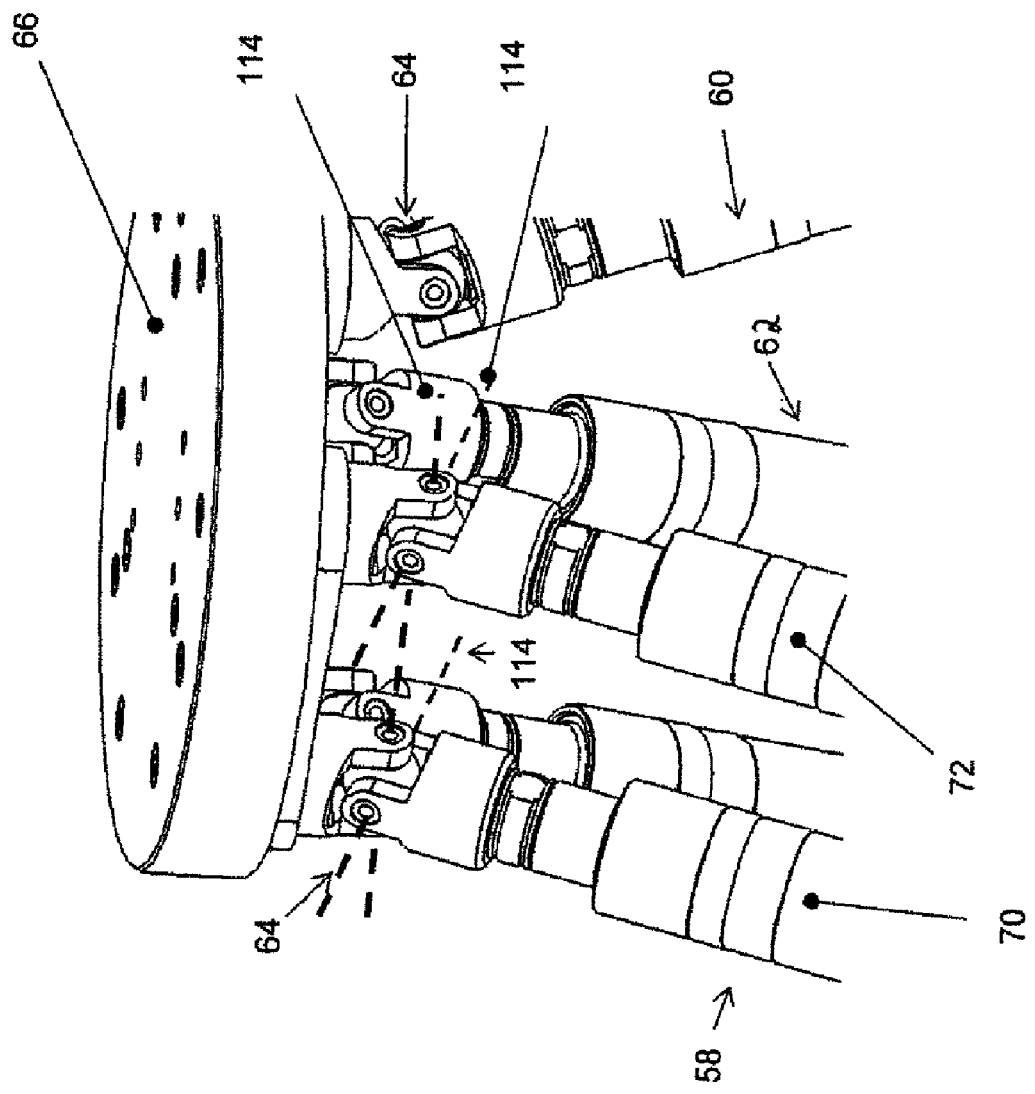
FIG. 8 shows a detailed view of the strut heads of the strut pair.

FIG. 8 shows the upper end of the strut pairs 58, 60, 62 at their point of connection to the tool plate 66. In this figure, too, known parts and structural parts are provided with reference symbols corresponding to those which have previously been introduced. In FIG. 8, the articulated shafts 114 are illustrated in order to make the degrees of freedom of the joints as visible as possible. In the following figures, the look of possible positions with the first positioning device, provided with such joints 64, is shown.

Figure 9:
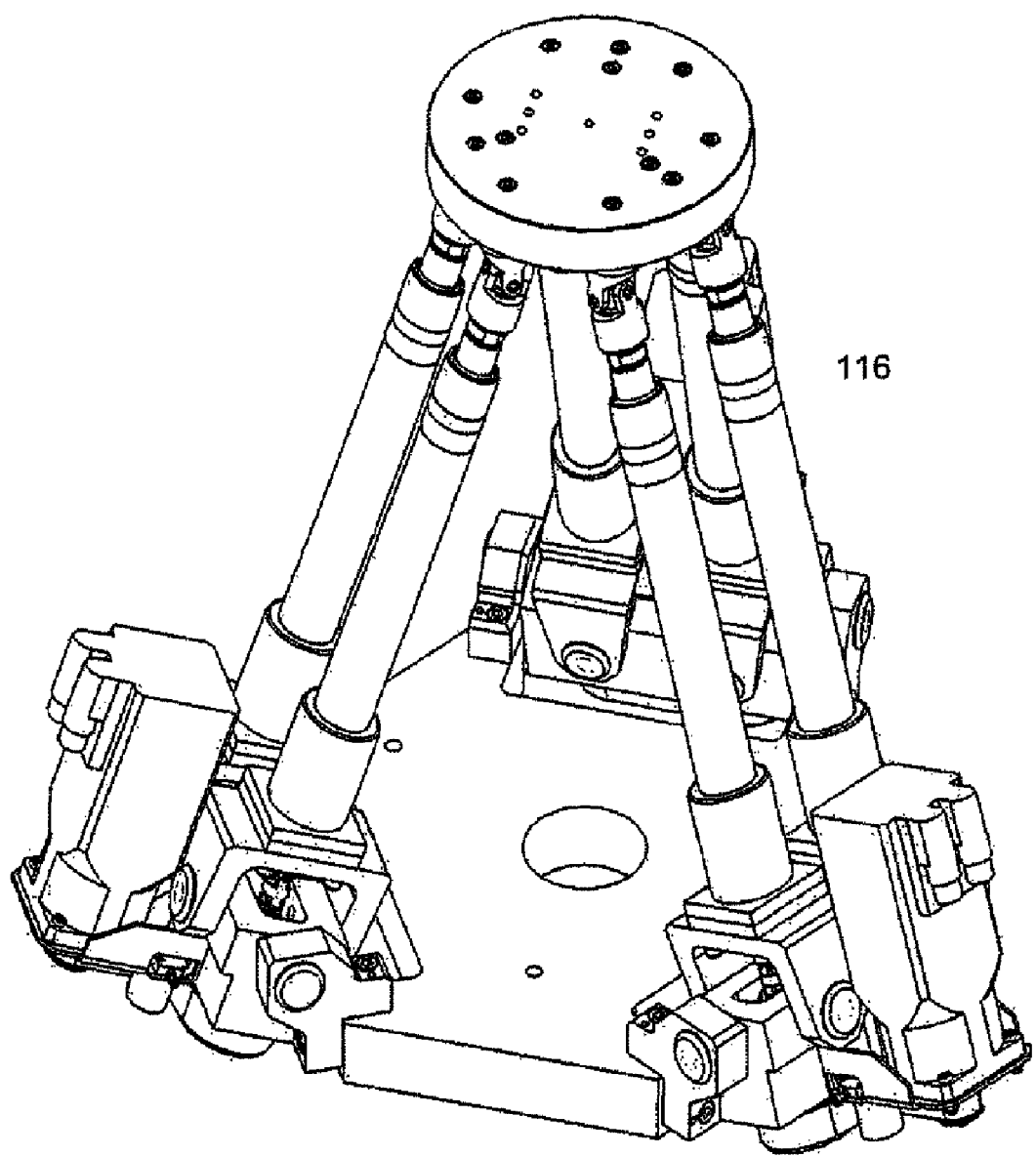
FIG. 9 shows a first exemplary position.

FIG. 9 shows a first position 116 of the first positioning device 52, in which the workpiece plate 66 is disposed precisely centrally above the base plate 54 and, moreover, the strut pairs 58, 60, 62 have been retracted to their minimum length.

Figure 10:
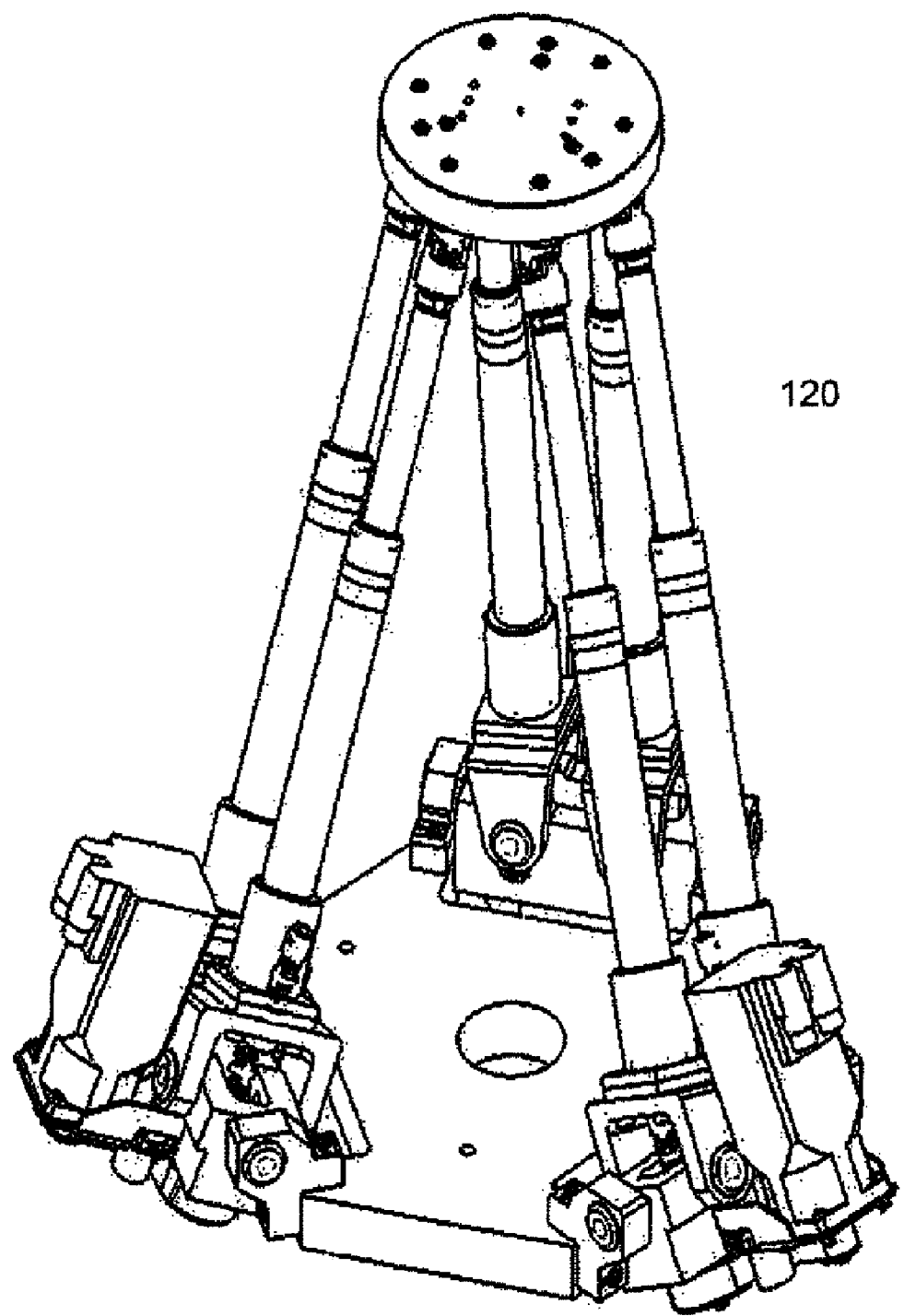
FIG. 10 shows a second exemplary position.

FIG. 10 shows a second position 120 of the first positioning device 52, in which the tool plate 66 is likewise disposed precisely centrally above the base plate 54, yet the strut pairs 58, 60, 62 have their maximum length. In the combined view of FIG. 10 with FIG. 9, it can be seen how the tool plate 66 can be positioned along one of its motional axes.

Figure 11:
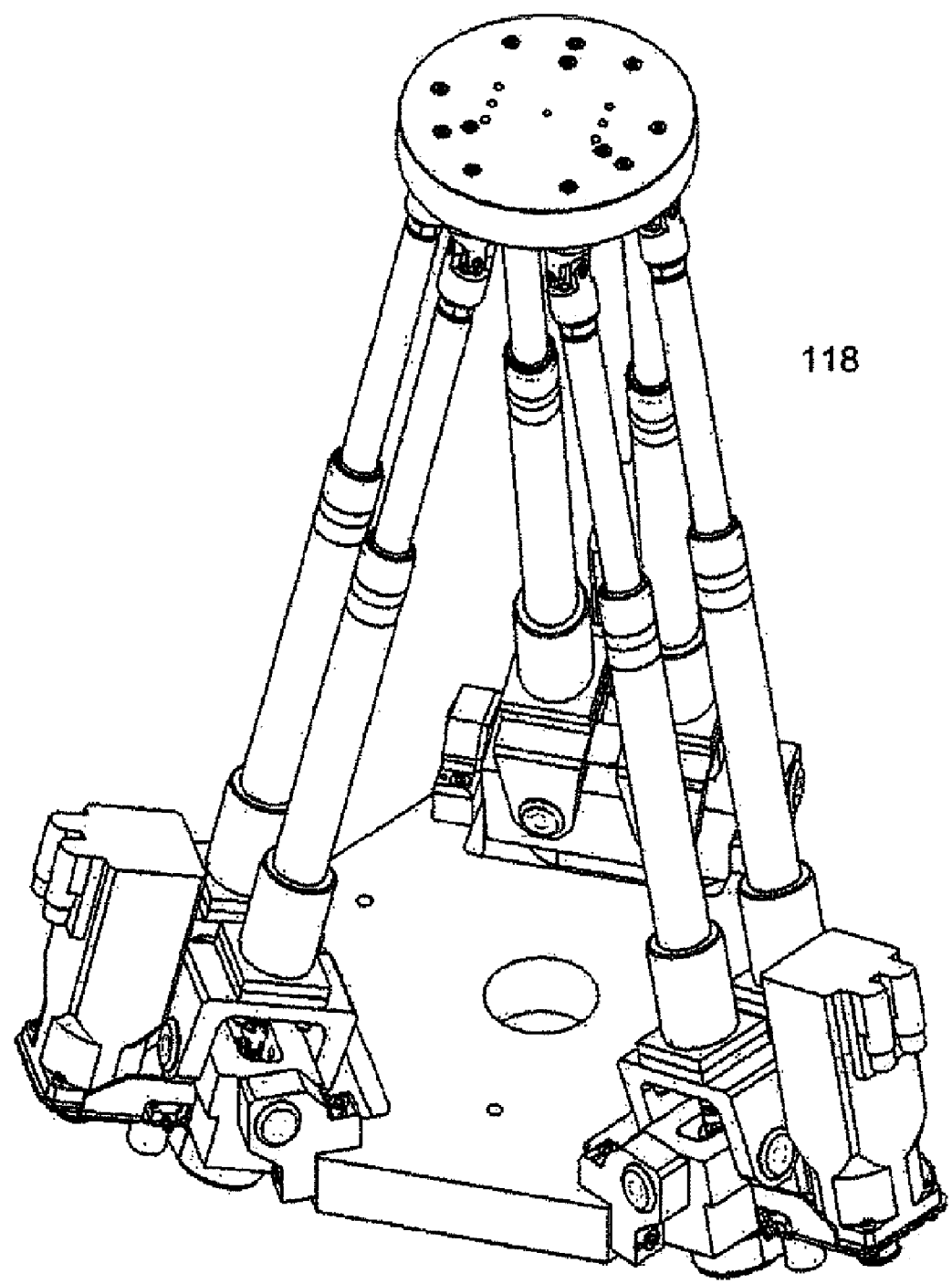
FIG. 11 shows a third exemplary position.

FIG. 11 shows a third position 118 of the first positioning device 52, in which the strut pairs 58, 60, 62 have a medium length in comparison to that from FIG. 9 and FIG. 10.

Figure 12:
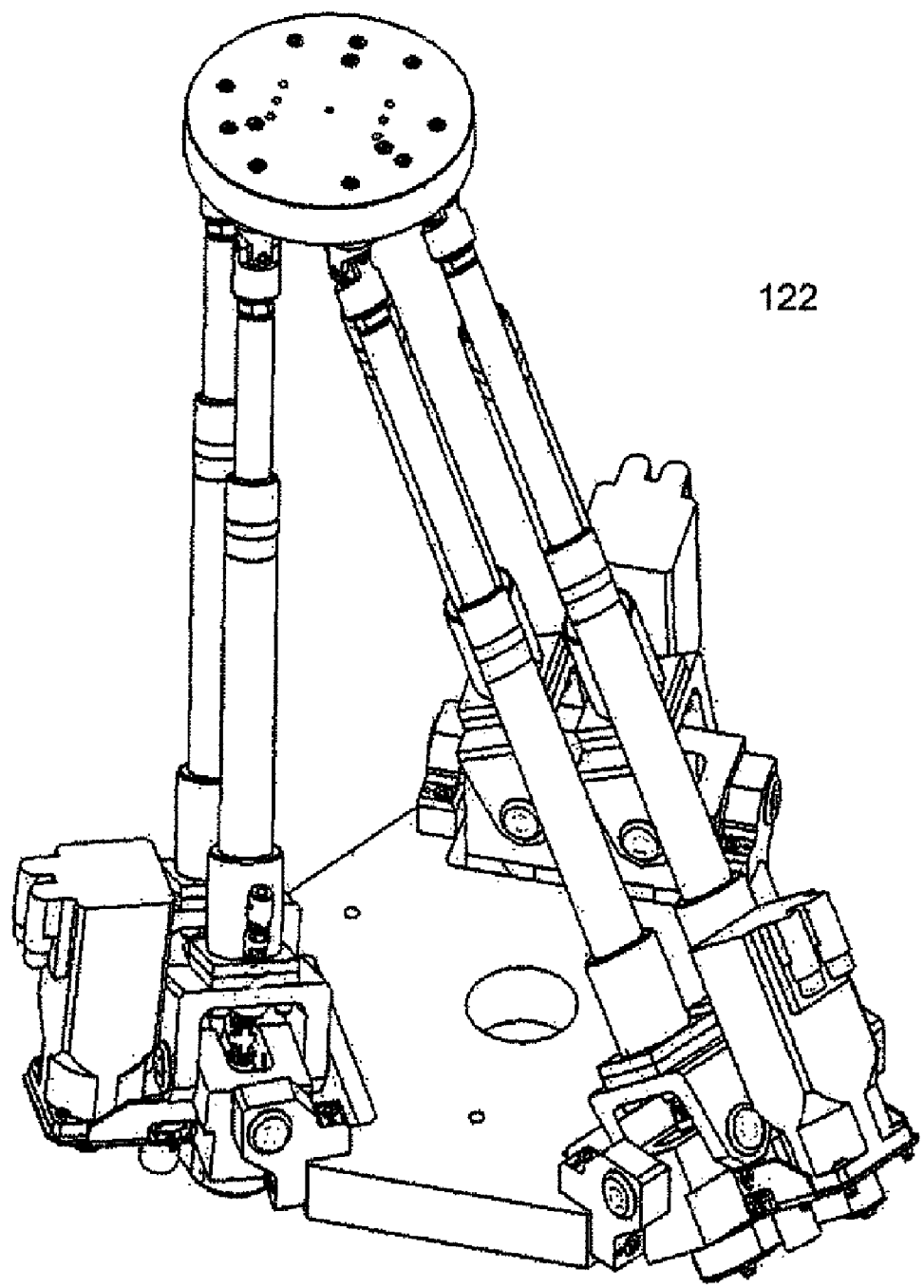
FIG. 12 shows a fourth exemplary position of the positioning device.

FIG. 12 shows a fourth position 122 of the first positioning device 52, in which the strut pair shown on the left in the picture has a shorter longitudinal extent than the two other strut pairs, so that, in the final analysis, the tool plate 66 is disposed almost directly above the strut pair shown on the left in the picture. The tool plate disk is here still arranged parallel to the base plate 54, as also in the preceding figures. The figure illustrates that, according to the effect of force and torque upon the tool plate 66, not only can compression forces act upon the strut pairs 58, 60, 62, but also tensile forces, depending on how the force or the torque acts upon the tool plate 66.

Figure 13:
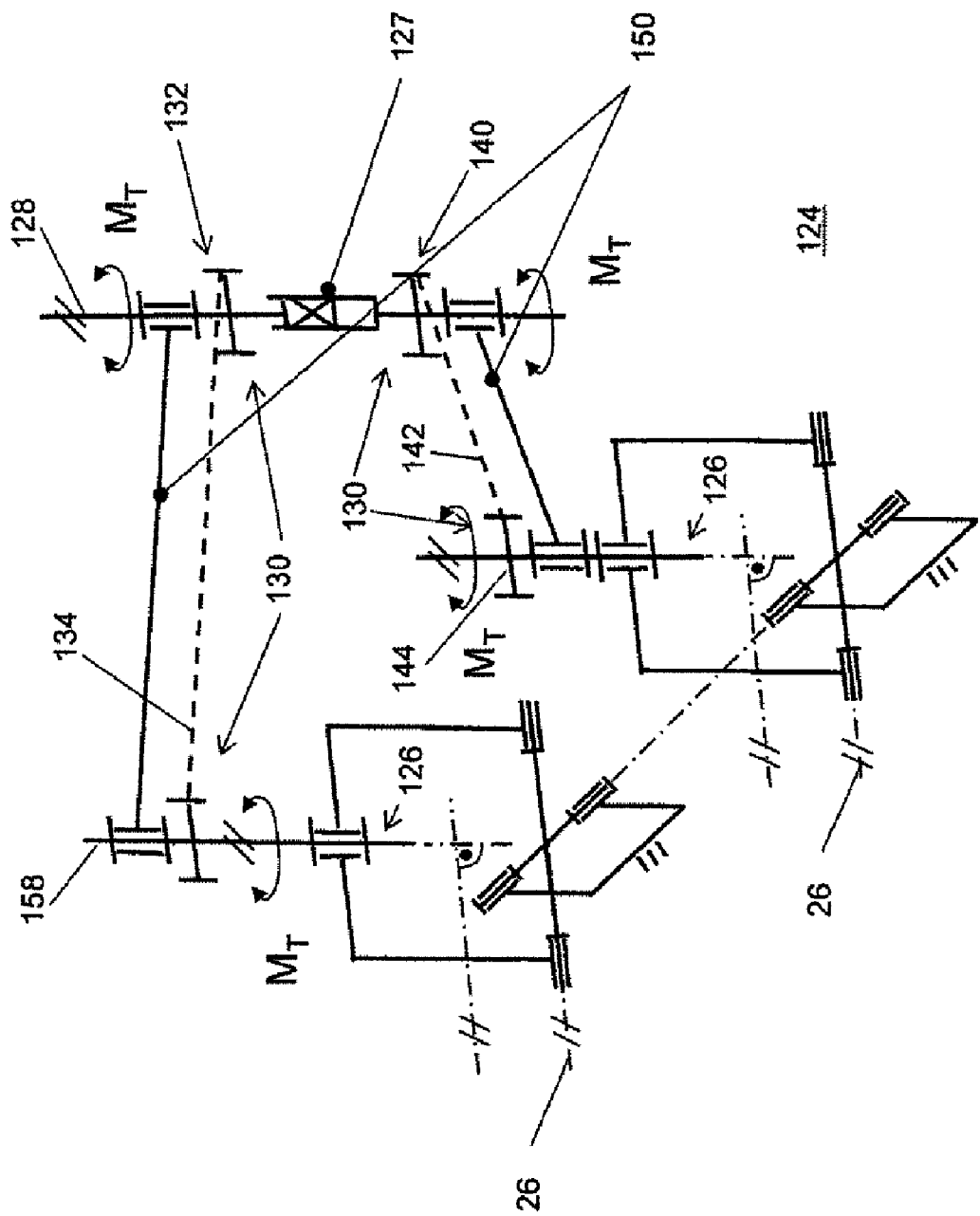
FIG. 13 shows a second plan for the coupling of a pair of supports.

FIG. 13 relates to a second embodiment 124 of a lower subassembly, which transmits the drive power of a motor to a strut pair in a specific manner. This figure merely shows a plan of the interaction of various structural elements, the symbols of the structural elements having been chosen to be the same as in FIG. 1 or 2. Hence, only the fundamental differences in comparison to the preceding drive systems shall also be described below.

The drive power for a fourth strut pair 126 is provided by a drive shaft 128. How the drive shaft 128 itself is driven is not represented in detail, though this can be done pneumatically, hydraulically, electrically or in other ways known to the person skilled in the art. Via a gear system 130, the drive power of the drive shaft 128 is transmitted to the struts of the fourth strut pair 126. In the chosen example, the gear system 130 has a first pinion 132, which is connected to a first connecting shaft 134 and in the drive situation rotates this. The rotation causes a second pinion 136 to be driven, which is disposed on a first strut rod 138. Correspondingly, a third pinion 140, which is disposed on the drive shaft 128, drives a second drive shaft 142, which in turn drives a fourth pinion 144, which is in turn disposed on a second strut rod 146. The strut rods 138, 146 are rotatable about their longitudinal axis and are correspondingly mounted, the mounting pointing in the strut end being supported, in a manner already described above, with a cardanic mounting 148. In order to absorb the bearing forces of a second bearing on the strut rods 138, 146, connecting rods 150 are provided, which connect the drive to said mounting. This is symbolized in the figure by the corresponding connecting rods 150, which connect the corresponding bearing symbols on the drive shaft 128 to the bearing symbols on the strut rods 138, 146. It is also equally conceivable that, instead of such connecting rods 150, a housing absorbs the bearing forces. A torsionally rigid length-compensating mechanism 127 finally allows the strut pair to be jointly pivoted about the rotational axes 26. without impairing the transmission of the drive power.

Figure 14:
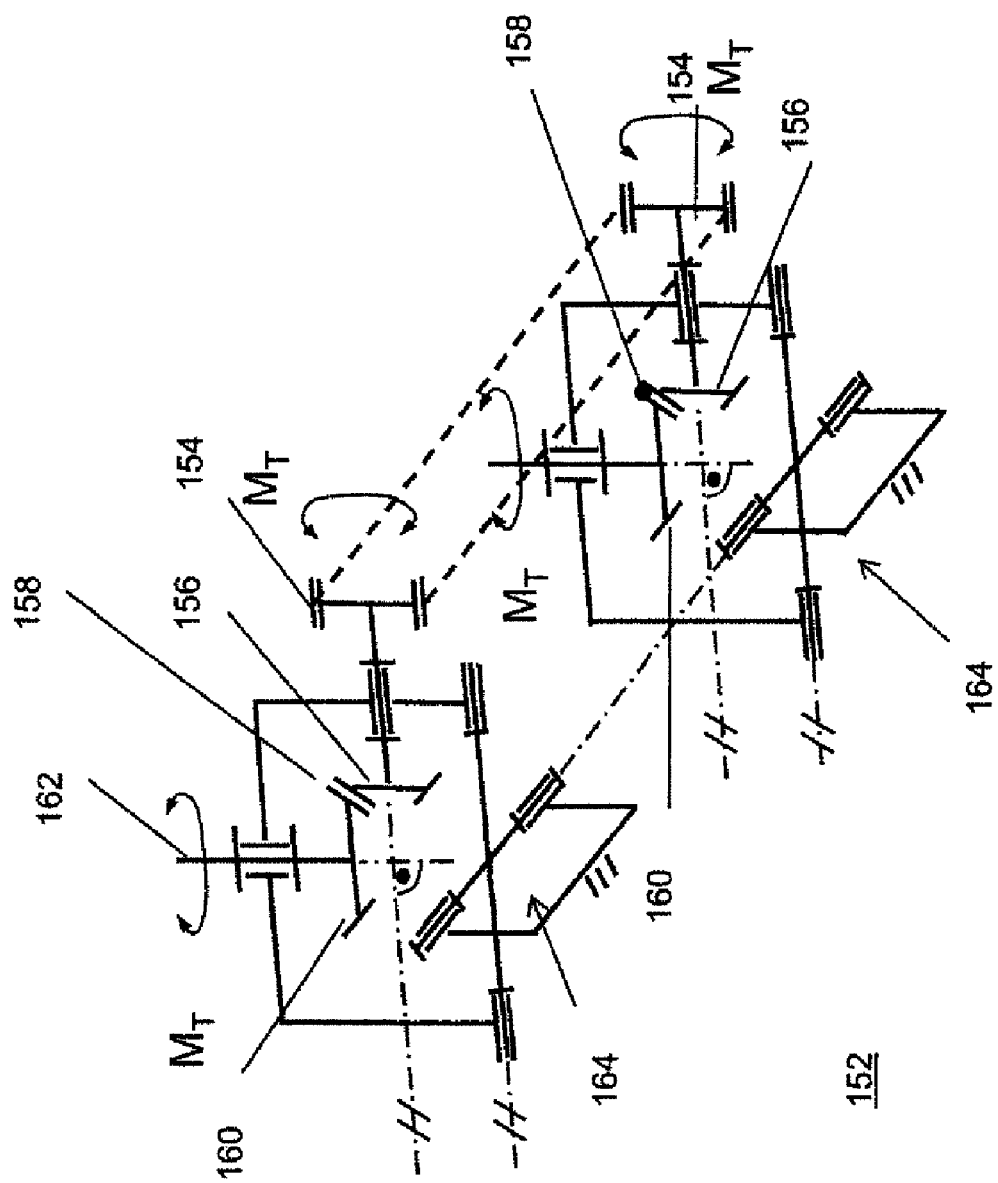
FIG. 14 shows a third plan for the coupling of a pair of supports.

As is shown by FIG. 14, the third embodiment 152 of the drive according to the invention uses a belt drive 152, which can be realized, for instance, as a toothed belt or as a V-belt or as a traction belt, to drive two drive pulleys 154. The drive pulleys 154 act upon respectively a first bevel gear 156 of a bevel gear train 158, which drives a second bevel gear 160 of the bevel gear train 158, which acts upon strut rods 162. These strut rods 162 are cardanically mounted in a universal mounting 164.

Figure 15:
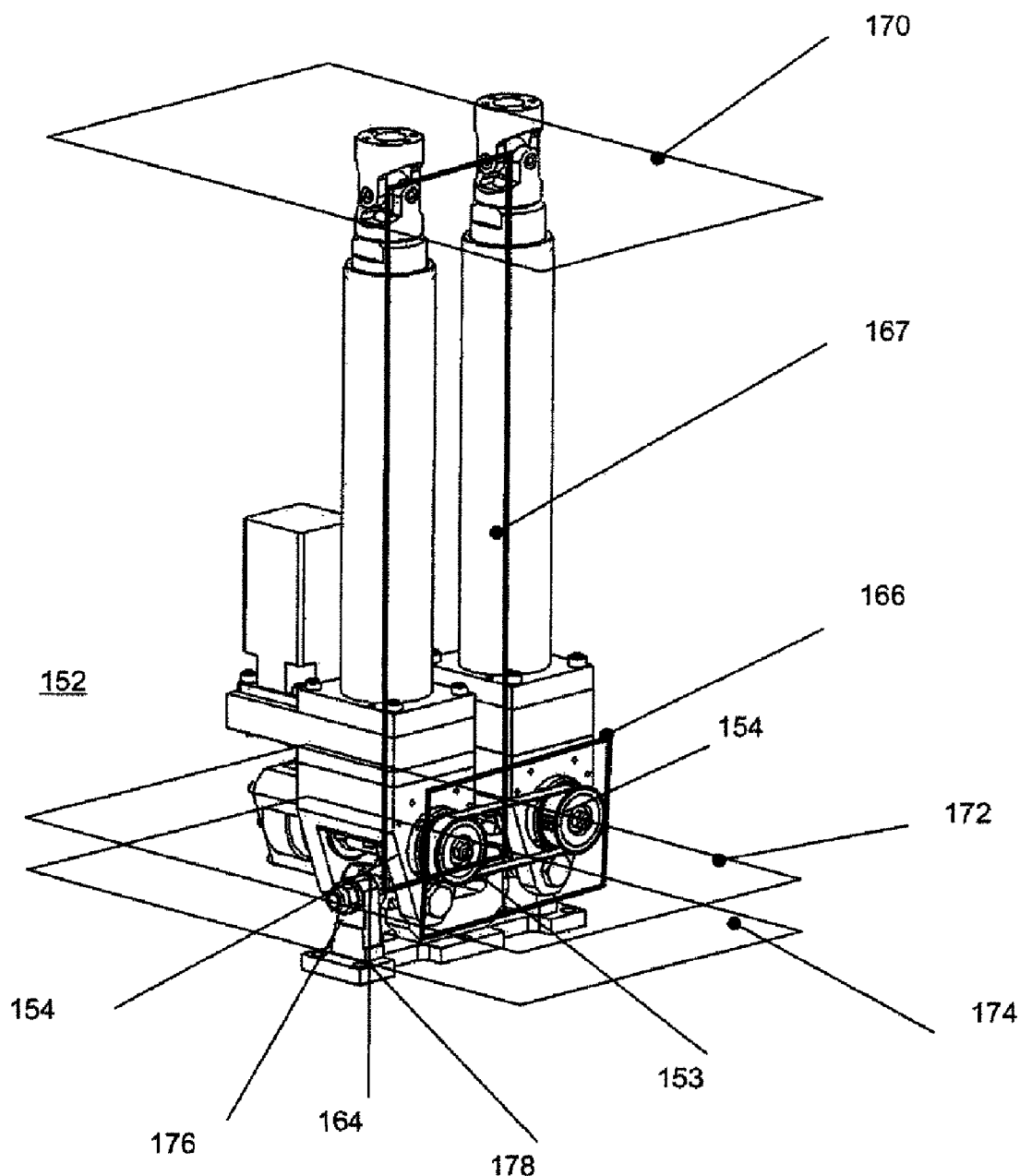
FIG. 15 shows a second example of a common drive for a pair of struts.

FIG. 15 shows a design of the third embodiment 152, which is schematically represented in FIG. 14 and is shown in principle in this figure as a design proposal. The corresponding visible structural parts are therefore also provided with the reference symbols in accordance with FIG. 14.

In this design, it has in fact proved particularly favorable that various technical functions lie respectively in one plane, which functions are indicated in the figure by corresponding squares. A first plane 166 is thus obtained, in which the drive is effected via the drive pulleys 154 and the drive belt 153. A second plane 167 is formed by the strut rods 138, 146 and the corresponding mountings at the two ends of the strut rods 138, 146. A third plane 170 is formed by a tool disk, which in this figure, however, is not shown, while a fourth plane 172 is defined by the rotational axes of the drive pulleys 154. Finally, a fifth plane 174 is also made visible, which lies parallel to the fourth plane 172 and is defined by a bearing point 176, namely a pivot bearing, which lies closest to a supporting foot 178. In this case, the supporting foot 178 of the connecting element is to a base structure (not represented in this figure), to which this embodiment could be connected.

Figure 16:
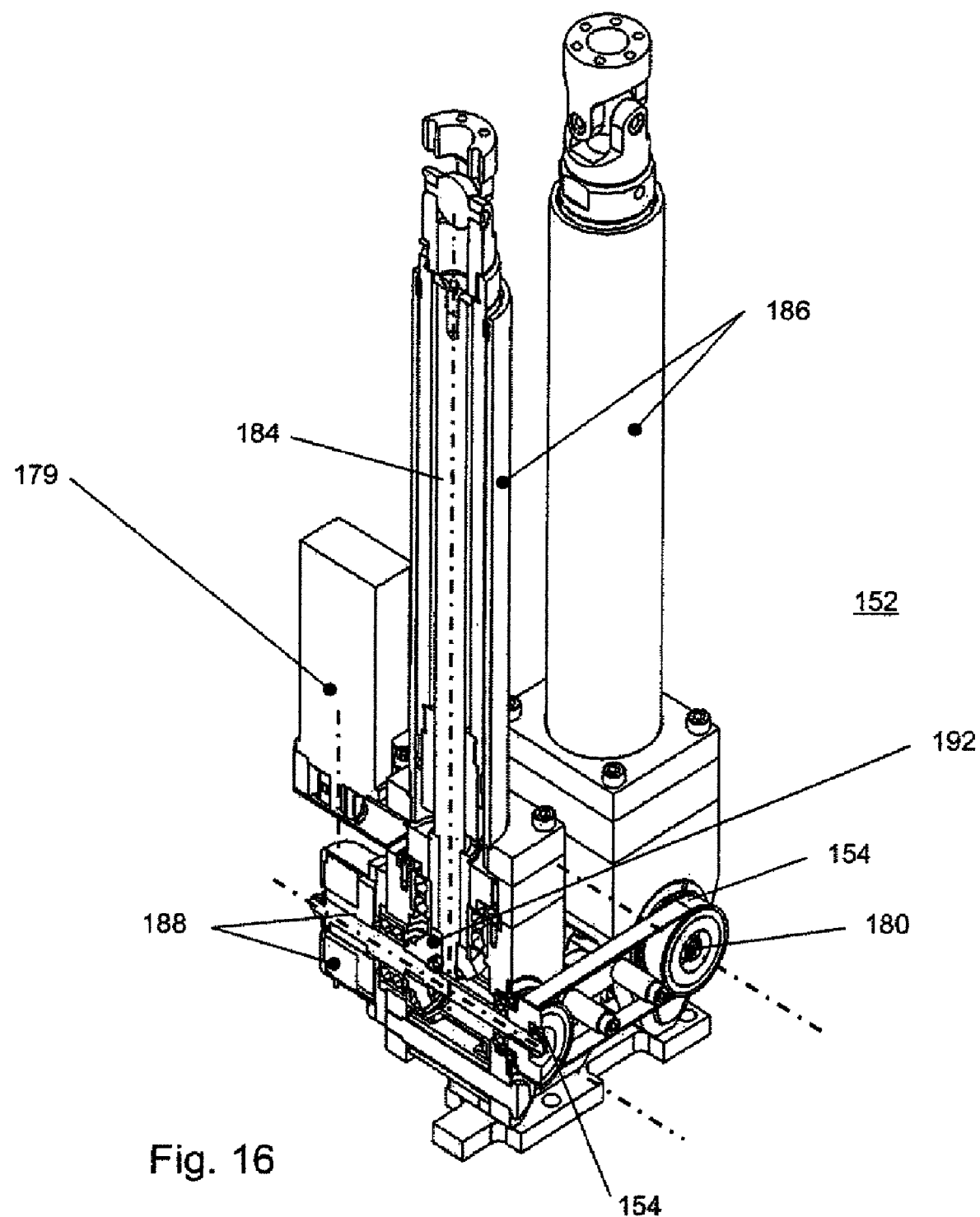
FIG. 16 shows a detailed view of the second example in the strut pair.

FIG. 16 shows a sectional representation of the third embodiment 152, for which reason reference symbols as before are used once again. In particular, in this figure it should be pointed out that a torque motor 179 is arranged such that it drives one of the drive pulleys 154 by means of a shaft 180. The other drive pulley 154 is in turn driven via the drive belt 153, which drives a further shaft 182. Via the shaft 180 and the further shaft 182, the corresponding secondary shafts 184 of the length-adjustable struts 186 are driven. In this case, the distance between the individual adjustable struts 186 is fixed both by the construction-dictated distance between the shaft 180 and the further shaft 182 and by the point of connection to a tool plate (not represented) at the other end of the length-adjustable struts 186 in the region of the upper universal joints 190. On the further shaft 182, on the side facing away from the drive pulley 154, a brake 188 is disposed, which, where necessary, blocks the further shaft 182. In this way, simple means can be used to ensure that the length-adjustable struts 186 are fixed in a predetermined position without the drive having had to absorb any forces which might be acting. That lends particular mechanical stability to this arrangement.

Further measures which contribute to the stability in this arrangement are the use of gearwheels for the force transmission, e.g. including a bevel gear 192, which, as in a 90° bevel gear train, transmits the working drive forces of the further shaft 182 to one of the secondary shafts 184.

Moreover, in this arrangement, a function separation is achieved, in which the torque motor 179 acts upon the shaft 180 and the first brake 188 acts upon the further shaft 182. In this way, a particularly compact arrangement of the individual technical functions is achieved.

Figure 17:
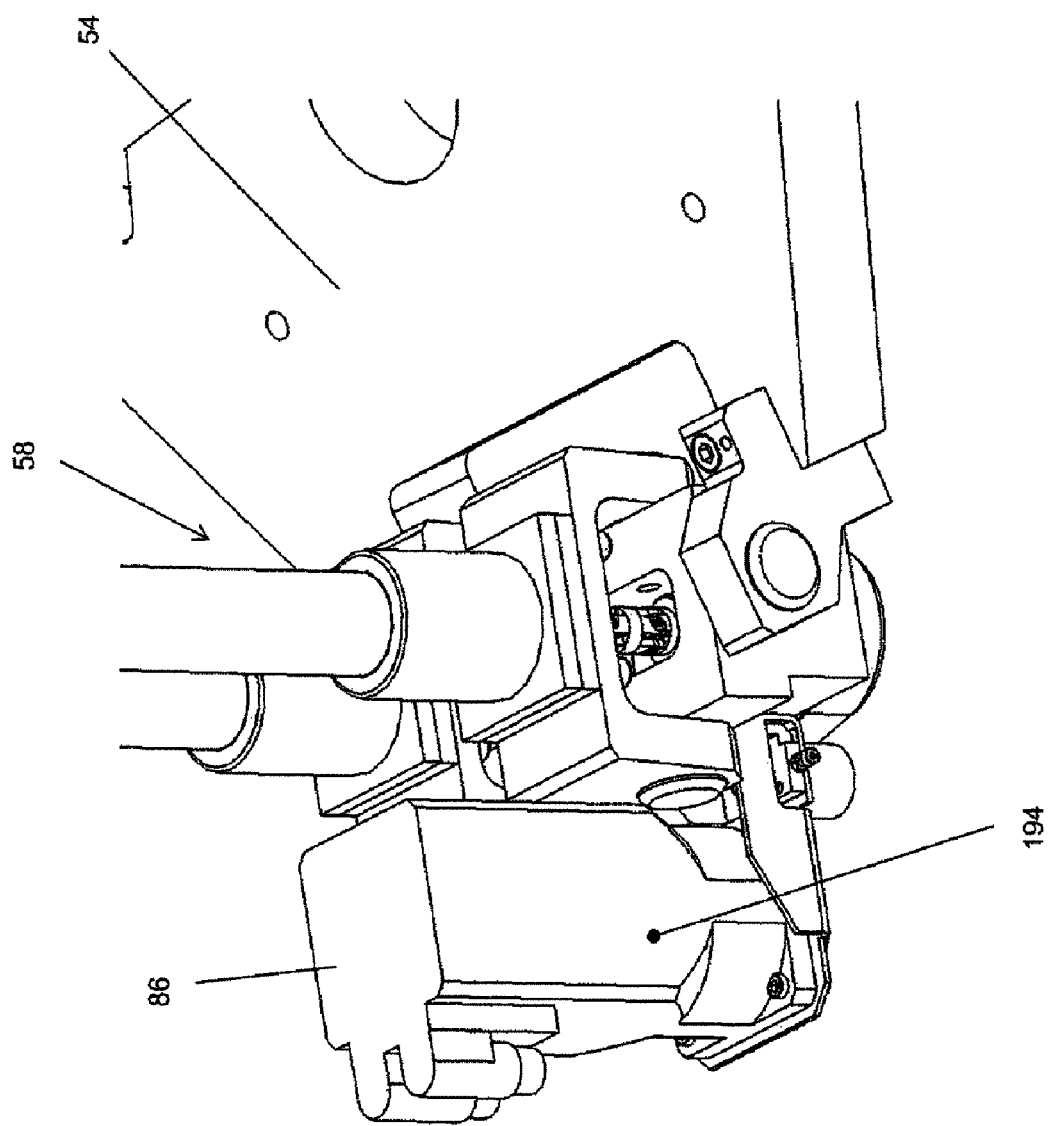
FIG. 17 shows a first exemplary arrangement.

A further brake arrangement is shown in FIG. 17, which again represents a detailed representation of the first strut pair 58, the aim being merely to show that in this figure a second brake 194 is already integrated in the electric motor 86.

Figure 18:
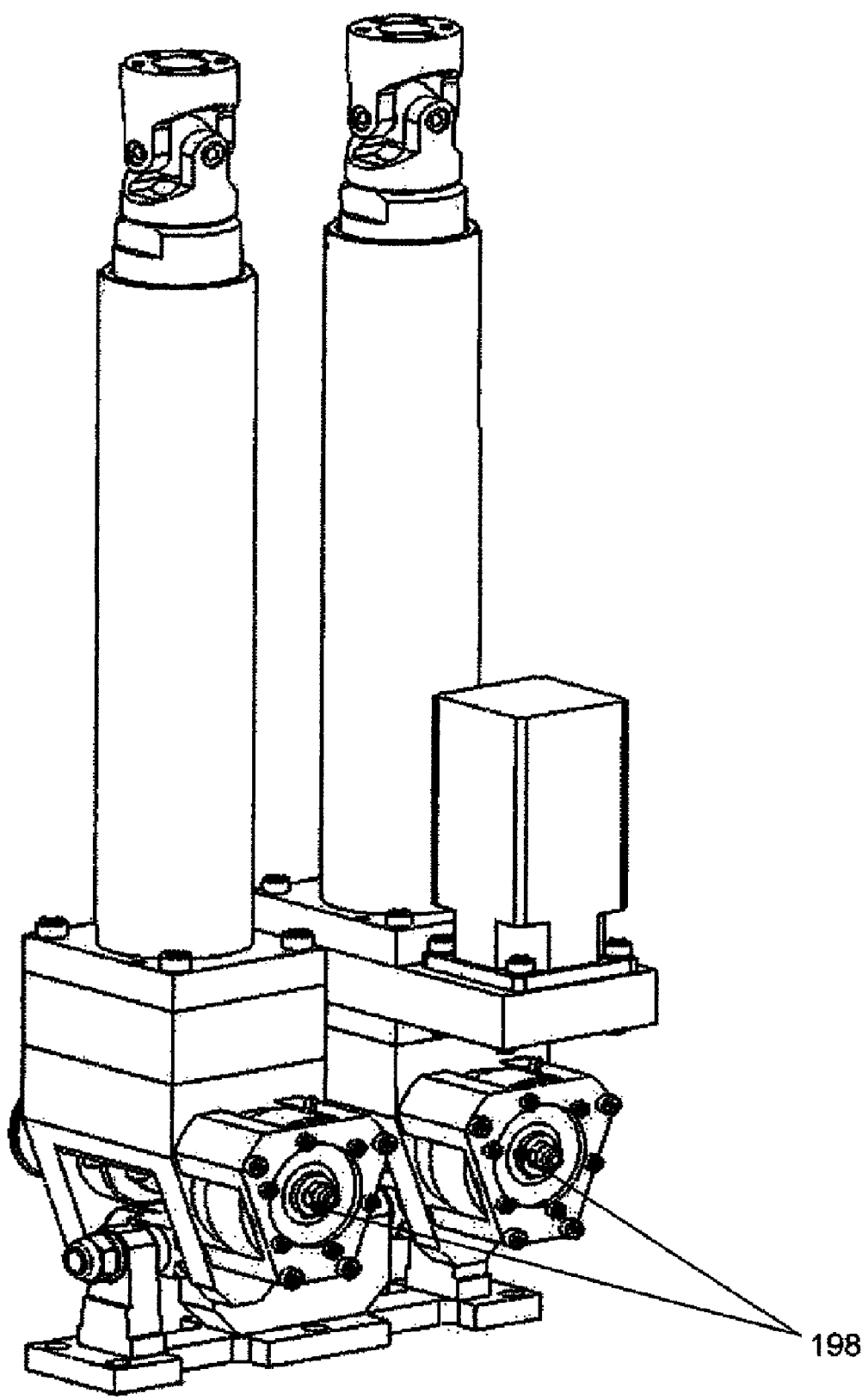
FIG. 18 shows a second exemplary arrangement of a strut pair with separate brakes.

FIG. 18 shows a construction variant of the brake 198, which has two part-brakes, disposed in a rotation shaft and a further rotation shaft, which respectively drive the secondary shafts of the two struts. In this set-up, a brake redundancy is achieved. Even if one of the part-brakes of the third brake 198 should fail, the other part-brake brakes via the mechanical operative coupling both secondary shafts, as well as, jointly, the secondary shaft which is not then directly braked. Moreover, the brakes are easily accessible, which facilitates the maintenance and inspection of the brakes.

Figure 19:
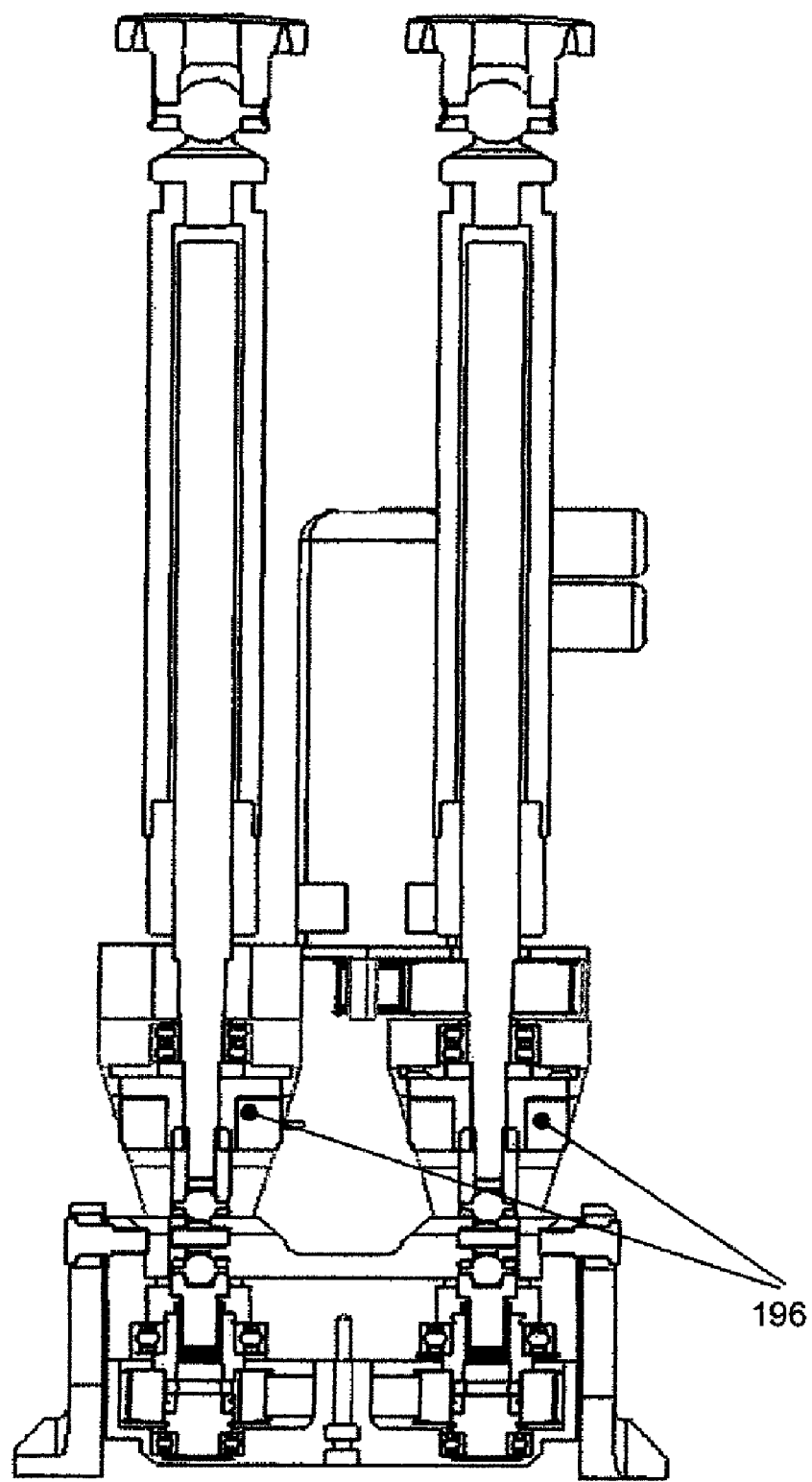
FIG. 19 shows a third exemplary arrangement.

FIG. 19 shows a further option and position for the arrangement of a brake pair 196. In this example, again two part-brakes are integrated in respectively one of the struts, so that the part-brakes act directly upon the secondary shafts and in this way can fix each individual strut by the corresponding brake forces.

The advantage here lies particularly in the fact that the construction becomes yet more compact and, moreover, the mechanical redundancy of the brake is maintained.

REFERENCE SYMBOL LIST 10 basic plan
12 first strut
14 second strut
16 piston-cylinder arrangement
18 first Cardan joint
20 second Cardan joint
22 supporting structure
24 first pivot bearing
26 second pivot bearing
28 first pivot axis
30 third pivot bearing
32 fourth pivot bearing
34 second pivot axis
36 axis
38 work carrier
40 first plan/articulated joint arrangement
42 upper shaft
43 lower shaft
44 first swivel bearing
46 second swivel bearing
48 length-compensating element
50 third Cardan joint
52 first positioning device
54 base plate
56 first connecting element
58 first strut pair
60 second strut pair
62 third strut pair
64 universal joint
66 tool plate
68 cutout
70 first strut
72 second strut
74 first cylindrical structural element
76 second cylindrical structural element
78 fifth pivot bearing
80 sixth pivot bearing
82 bearing shaft
84 seventh pivot bearing
86 electric motor
88 second connecting element
90 supporting structure
92 third connecting element
94 first pivot arc
95 mechanical connector
96 lower subassembly
98 fourth Cardan joint
100 fifth Cardan joint
102 rods
106 drive shaft
107 second embodiment
108 second electric motor
110 toothed belt
112 drive pulleys
114 articulated shafts
116 first position
118 third position
120 second position
122 fourth position
124 second embodiment
126 fourth strut pair
128 drive shaft
130 gear system
132 first pinion
134 first drive shaft
136 second pinion
138 first strut rod
140 third pinion
142 second drive shaft
144 fourth pinion
146 second strut rod
148 cardanic mounting
150 connecting rods
152 third embodiment
154 drive pulleys
156 first bevel gear
158 bevel gear train
160 second bevel gear
162 strut rods
164 universal mounting
166 first plane
167 second plane
170 third plane
172 fourth plane
174 fifth plane
176 bearing point
178 supporting foot
179 torque motor
180 shaft
182 further shaft
184 secondary shaft
186 length-adjustable struts
188 first brake
190 upper universal joint
192 bevel gear
194 second brake
196 third brake
198 fourth brake

The invention claimed is:

1. A positioning device comprising:
a supporting structure;
a work carrier;
at least six length-adjustable struts arranged in strut pairs disposed in a triangle, each strut being moveably mounted to the supporting structure and to the work carrier, wherein the respective struts of at least two of the strut pairs are disposed parallel to each other; and
each strut pair including a common drive configured to synchronously adjust a length of the respective struts, wherein each strut pair includes at least one pivot bearing disposed at a first end of the respective struts and a second bearing disposed at a second end of each strut.

2. The positioning device as recited in claim 1, wherein the at least one pivot bearing includes a pivot bearing associated with each strut in the respective strut pair, and wherein the respective pivot bearings in each strut pair have a common bearing shaft axis.

3. The positioning device as recited in claim 1, wherein the struts are six in number.

4. The positioning device as recited in claim 1, wherein each common drive includes at least one of a hydraulic drive, a pneumatic drive and an electric drive.

5. The positioning device as recited in claim 1, further comprising an angle-preserving connection connecting each common drive to the respective strut pair.

6. The positioning device recited in claim 5, wherein the angle-preserving connection includes at least one of a belt, a toothed belt, a gear system and a plurality of gearwheels.

7. The positioning device as recited in claim 1, further comprising a plurality of braking devices, each assigned to one of the strut pairs and configured to brake a motion caused by the respective drive.

8. The positioning device as recited in claim 1, wherein the first end of each strut pair is assigned to the supporting structure.

9. The positioning device as recited in claim 1, wherein each strut pair has a third bearing disposed at the first end.

10. The positioning device as recited in claim 9, wherein a sum of degrees of freedom of the pivot bearing, of the second bearing and of the third bearing corresponds to a total degrees of freedom for an anticipated load on the work carrier.

11. The positioning device as recited in claim 1, wherein the pivot bearing includes a cardanic bearing.

12. The positioning device as recited in claim 1, further comprising at least one position measuring device associated with at least one of the common drives and the at least six struts.

13. The positioning device as recited in claim 12, further comprising a control device configured to predetermine at least one of a setting and a position of the work carrier based on position data from the position measuring device.

* * * * *